Nov. 29, 1960

C. W. PRIDGEON 2,962,177

BALE LOADER AND STACKER

Filed Sept. 15, 1958

INVENTOR.
CLIFFORD W. PRIDGEON

BY

ATTORNEYS

Nov. 29, 1960 C. W. PRIDGEON 2,962,177
BALE LOADER AND STACKER
Filed Sept. 15, 1958 3 Sheets-Sheet 2

INVENTOR.
CLIFFORD W. PRIDGEON
BY
Moore, White & Burd
ATTORNEYS

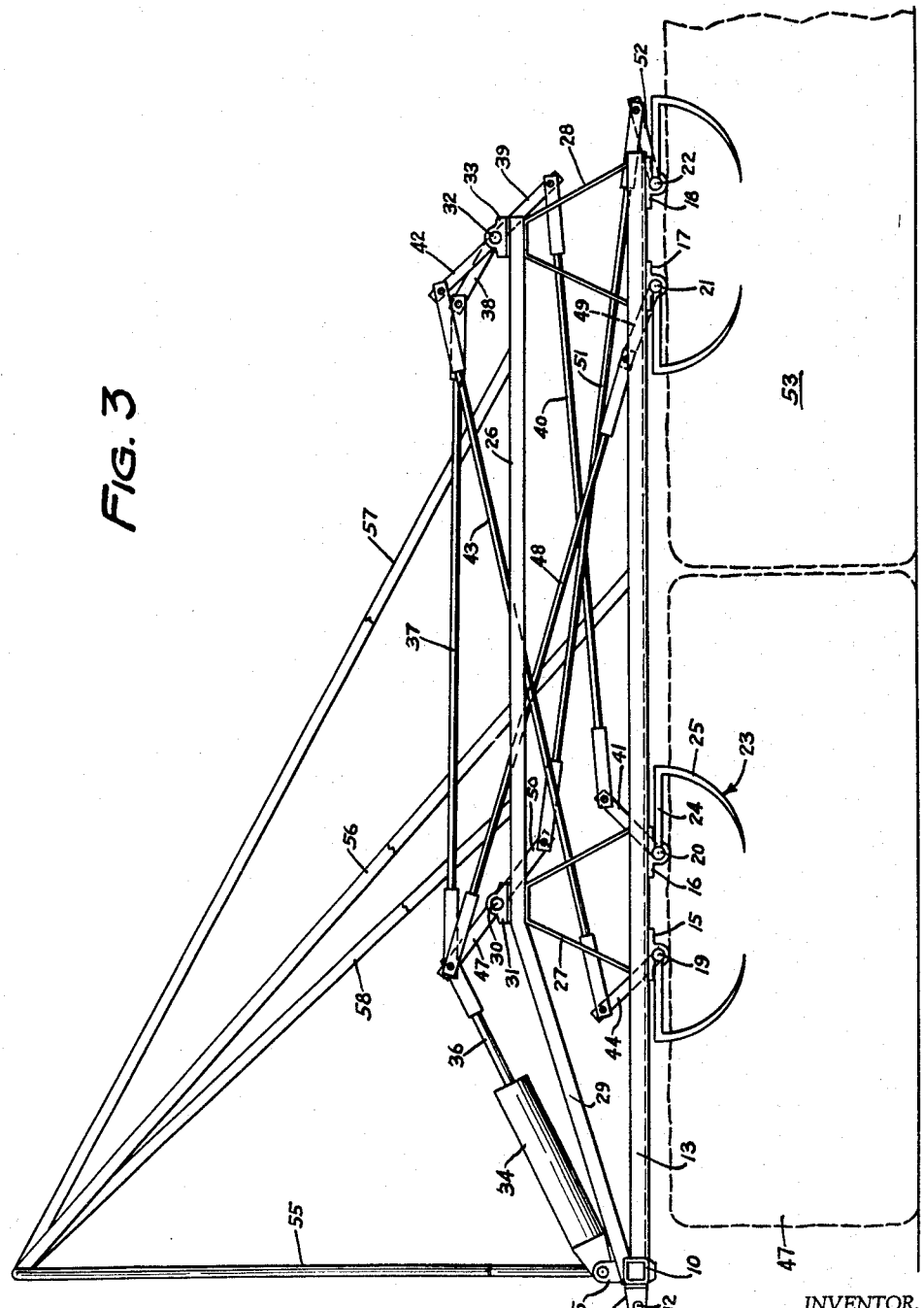

United States Patent Office 2,962,177
Patented Nov. 29, 1960

2,962,177

BALE LOADER AND STACKER

Clifford W. Pridgeon, Chinook, Mont.

Filed Sept. 15, 1958, Ser. No. 760,994

8 Claims. (Cl. 214—147)

This invention relates to apparatus for mounting on a tractor or other mobile power unit for loading, transporting, and stacking a plurality of bales of hay or the like and for removing bales from a stack.

The principal object of this invention is to provide a bale loading and stacking attachment for use with a tractor or the like by which a plurality of bales may be simultaneously lifted while maintained tight and neat against adjoining bales and stacked or unstacked without breaking, damaging or disturbing the relative side by side positions of the bales.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 3 is a side elevation similar to Figure 1 but showing the grappling hooks in bale retaining position.

Figure 1:
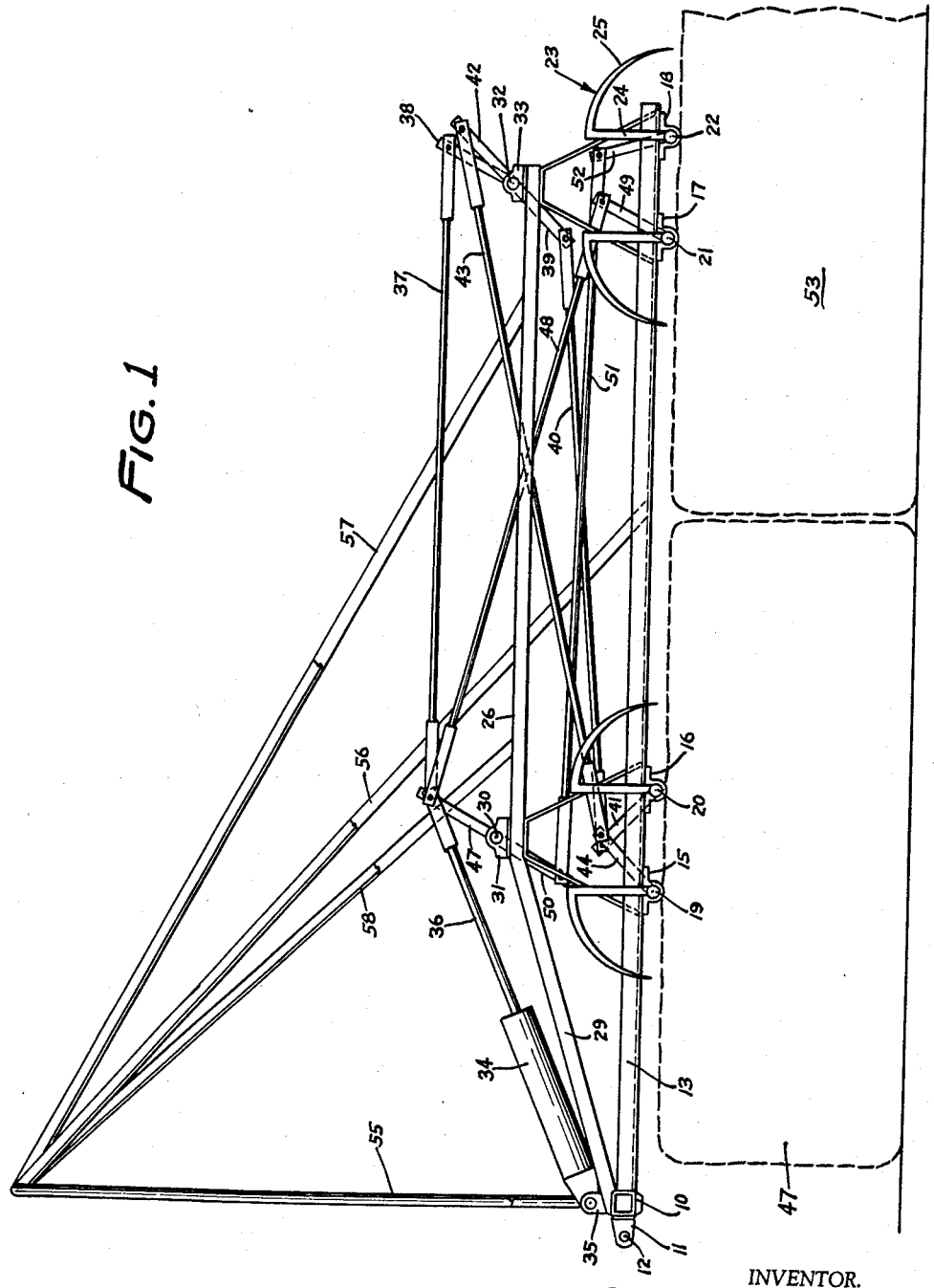
Figure 1 is a side elevation of the bale loader and stacker of this invention, shown with grappling hooks in position prior to engagement of bales thereby or subsequent to release of bales.
Figure 2:
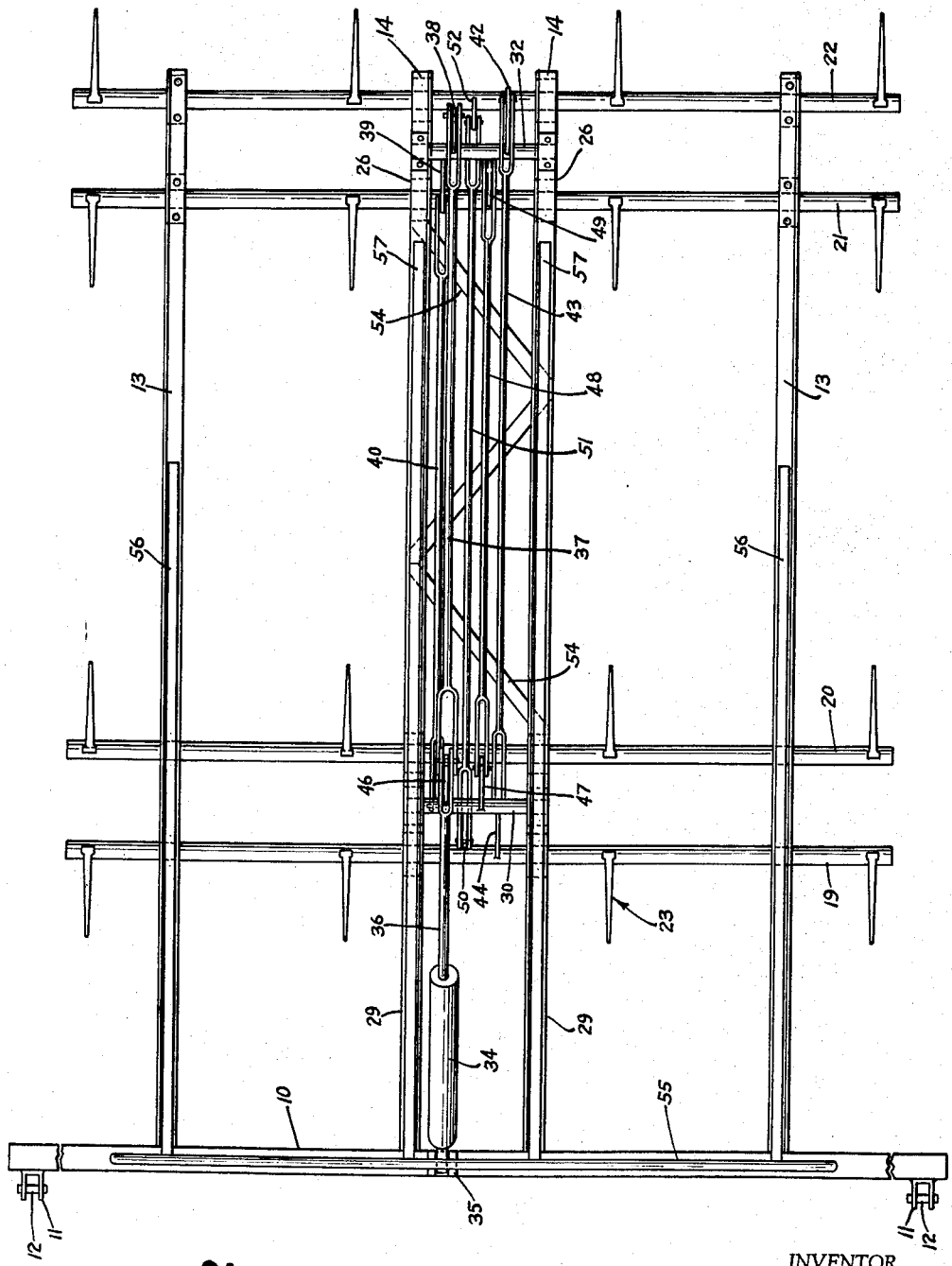
Figure 2 is a top plan view of the stacker and loader shown in Figure 1.

This invention relates to a bale loading and stacking attachment for use in conjunction with existing lifting mechanisms mounted on tractors and similar mobile power units. There are commercially available a variety of mechanisms for attachment to tractors and the like for vertically lifting and moving operational elements such as shovels, buckets, racks, forks and the like. Such elements are usually operated through hydraulic cylinders or by means of cables and winches. Exemplary of the types of lifting means with which the attachment of this invention may be used are those shown in the United States patent to Snyder, No. 2,501,243, for a Manure Loader Attachment, and that issued to Drott et al., No. 2,488,767, for a Tractor Mounted Grab Loader. The present invention is not limited to the use of any particular lifting mechanism, but is adapted for use with any such unit capable of lifting and transporting bales and elevating them high enough to form a stack.

Referring now to the drawings, the stacker and loader device of this invention includes a transverse horizontal base frame member 10 provided with a pair of clevises 11 and pins 12 for pivotal attachment of the loader and stacker device to the lifting mechanism of a tractor or the like. The clevises 11 are spaced on the frame member 10 to adapt the loader and stacker attachment to the particular lifting mechanism with which it is to be used. The clevises are evenly spaced along the frame member 10 to maintain the balance of the loader and stacker device. A pair of like parallel horizontal outer frame members 13 and a similar pair of like parallel horizontal inner frame members 14 are secured to and project out forwardly from the base transverse frame member 10. The frame member 10 is attached to the lifting mechanism on the tractor and is adapted to be disposed horizontally adjacent one end of the tractor. The parallel frame members 13 and 14 project longitudinally from that end of the power vehicle.

The bottom surfaces of the longitudinal frame members 13 and 14 each carry a plurality of pairs of bushings or bearings 15, 16, 17 and 18 which in turn carry parallel horizontal transverse hook-bearing shafts 19, 20, 21 and 22, respectively. Each of the shafts is supported below the longitudinal frame members and preferably extends beyond the limits of the outer parallel frame member 13. Each of the shafts is rotatable in its bushings and each shaft carries a plurality of like grapple hooks, indicated generally at 23. Each grapple hook preferably is comprised of a straight arm portion 24 which is fixed at one end to the shaft and extends radially outwardly therefrom, and at the other end is provided with a tapered arcuate tine 25. The curved tine 25 lies generally in the arc defined by rotation of the outer end of the straight arm portion 24 of the grapple hook about the axis of the shaft.

The shafts are arranged in parallel cooperating pairs. Thus shafts 19 and 20 form one cooperating pair and shafts 21 and 22 form a second cooperating pair. All of the hook elements 23 on a single shaft are disposed with the straight arm portions 24 lying in the same plane and the curved tine portions 25 extending in the same direction. The hook elements 23 on the two shafts of each cooperating pair of shafts, however, are disposed with the tine elements 25 in opposite directions extending inwardly toward one another when in the position shown in Figure 3. Individual pairs of cooperating grapple hook elements lie generally in the same plane and the pair of hook members supported by one pair of shafts preferably lie generally in the same plane as the corresponding hooks carried by the other pair of shafts.

A secondary upper frame structure including a pair of parallel horizontal frame members 26 are disposed above and spaced from frame members 14 supported by two pairs of brace means 27 and 28. A pair of rearward extensions 29 from horizontal frame members 26 extend diagonally down to the transverse frame member 10 to impart greater rigidity and strength to the secondary frame structure. A short transverse control shaft 30 is journaled in a pair of bearings 31 each supported by one of the upper horizontal frame members 26. A similar short transverse control shaft 32 is journaled in a pair of bearing structures 33 supported at the opposite end of the upper frame members 26. The control shafts 30 and 32 are positioned above and approximately equally spaced between the pairs of longer transverse hook-bearing shafts 19 and 20, and 21 and 22, respectively.

A hydraulic cylinder 34 is pivotally mounted in a clevis 35 secured to the base transverse frame member 10. The piston of hydraulic cylinder 34 is provided with a piston rod 36 adapted to be retracted into or projected out from the end of the cylinder upon application of fluid pressure to opposite sides of the piston, as is well understood in the art. The free end of piston rod 36 is pivotally connected to one end of an elongated master link or lever 37 whose opposite end is pivotally connected to a stationary control arm 38 secured to and extending radially outwardly from shaft 32. A second rigid arm 39 is secured to and extends radially outwardly from control shaft 32 spaced from the first arm 38 and generally on the opposite side of the shaft 32. The end of rigid lever arm 39 is pivotally connected to one end of an elongated lever or link 40 whose opposite end is pivotally connected to an arm 41 extending radially outwardly from and rigidly secured to hook-bearing shaft 20. Transverse control shaft 32 carries still a third rigid arm 42 extending radially outwardly therefrom spaced from both arms 38 and 39 and extending generally in a direction diametrically opposite from the direction of arm 39. The free end of lever arm 42 is pivotally connected to one end of an elongated lever or link 43 whose opposite end is pivotally connected to a rigid arm 44 secured to and extending radially outwardly from hook-bearing shaft 19.

By comparison between Figures 1 and 3 it will be seen that as the hydraulic fluid controlling cylinder 34 is introduced above the piston in the cylinder so as to retract piston rod 36, the master lever 37 is moved to the left and acts upon arm 38 to rotate control shaft 32 in its bearings. When control shaft 32 is rotated in a counter-clockwise direction, as viewed in Figures 1 and 3, the lever arms 39 and 42 keyed to shaft 32 are likewise so moved. Movement of arm 39 causes the lever or link 40 to be moved to the right to move arm 41 in a clockwise direction, when viewed in Figures 1 and 3, to rotate shaft 20 in its bearings through about a quarter turn in that direction. Rotation of shaft 20 moves the grapple hooks 23 on that shaft from the position shown in Figure 1 to the position shown in Figure 3 with the result that, when the frame of the stacker is rested on the top surface of a group of bales, the tines 25 of the several grapple hooks enter and engage the bales 45. At the same time the arm 42 moves link or lever 43 to the left, which in turn causes arm 44 to be moved in a counter-clockwise position, as viewed in Figures 1 and 3. This causes counter-clockwise rotation of shaft 19 in its bearings through about a quarter turn and with it, rotation of the grapple hooks 23 on shaft 19 into engagement with the bales 45 in cooperation with the corresponding grapple hooks on shaft 20.

The piston rod 36 is also pivotally connected to a control arm 46 secured to and projecting radially outwardly from control shaft 30. Thus, as the piston rod 36 is retracted or extended, it causes rotation of shaft 30 in its bearings simultaneously with rotation of control shaft 32. A second arm 47 is secured to shaft 30 and projects radially outwardly therefrom spaced from arm 36 and extending generally in the same direction. The free end of lever arm 47 is pivotally connected to one end of an elongated link or lever 48 whose opposite end is pivotally connected to an arm 49 secured to hook-bearing shaft 21. Control shaft 30 is provided with still a third arm 50 positioned on shaft 30 between arms 46 and 47 but extending radially outwardly in the opposite direction. The free end of lever arm 50 is pivotally connected to one end of an elongated link or lever 51 whose opposite end is pivotally connected to an arm 52 secured to hook-bearing shaft 22. Thus, as piston rod 36 is extended or retracted, control arm 47 through its pivotal connection with the piston rod causes rotation of control shaft 30 in its bearings 31.

As the piston rod is retracted, control shaft 30 is rotated about a quarter turn in a counter-clockwise direction and with it moves lever arms 47 and 50 in a counter-clockwise direction, as viewed in Figures 1 and 3. As arm 47 is so moved, it causes link or lever 48 to be moved to the left to move arm 49 on hook-bearing shaft 21 in the same direction to rotate shaft 21 in its bearings 17. Rotation of shaft 21 about a quarter turn causes rotation of the several grapple hooks 23 on that shaft into engagement with the bales 53. At the same time, movement of arm 50 causes link or lever 51 to be moved to the right to push arm 52 on hook-bearing shaft 22 in a clockwise direction, when viewed in Figures 1 and 3, to cause clockwise rotation of shaft 22 in its bearings 18. Clockwise rotation of shaft 22 about a quarter turn causes clockwise rotation of the grapple hooks 23 spaced on the shaft permitting the tines 25 to penetrate and engage the bales 53 in cooperation with the grapple hooks on shaft 21.

It will readily be seen that all of the grapple hooks 23 are caused to move simultaneously under control of hydraulic cylinder 34. Rotation of control shaft 30 which governs the grapple hooks on shaft 21 and 22 is controlled through the direct pivotal connection between control arm 46 and piston rod 36. Rotation of control shaft 32 which governs rotation of the grapple hooks on shaft 19 and 20 is in turn controlled through the indirect connection by master link or lever 37 between the piston rod 36 and control arm 38 on shaft 32. The pivotal connections between the shaft control arms and links is preferably through clevises.

Diagonal braces 54 extending between the parallel longitudinal frame members 14 impart additional rigidity to the frame. An inverted U-shaped vertical support 55 is mounted on the transverse base frame member 10. A pair of diagonal brace elements 56 extend from the top of the frame member 55 to the outside pair of parallel longitudinal frame members 13. A similar pair of parallel diagonal brace elements 57 extend from the top bar of the brace support 55 to the pair of upper parallel longitudinal secondary frame members 26. To impart additional strength a second pair of diagonal braces 58 extend from the top bar of the brace support 55 to a point on the frame members 26 spaced rearwardly, or to the left as viewed in the figures, from the point of attachment of the braces 57.

The stacker and loader attachment of this invention is attached to the lifting mechanism of a tractor or similar mobile power unit. It may be used, for example, to simultaneously lift a plurality of bales of hay, or like bales of material, to transfer them from the ground to a stack, or from the bed of a truck or trailer to a stack, or from the top of a stack to the ground, or to the bed of a truck or trailer, or the like. Using the illustrated form of the invention, as many as eight bales may be simultaneously lifted to or from a stack. The device may be used to build a stack of bales by lifting successive layers of bales one on top of the other, and in the same manner may be used to load a truck or a trailer from an existing stack of bales. All of the bales in a single layer are simultaneously engaged by the tines of the grapple hooks penetrating the bales. This is accomplished by rotation of the shafts carrying the hook elements by virtue of actuation of the hydraulic motor in the manner already described. Because the grapple hooks are arranged in cooperating pairs, the bales are firmly and securely engaged.

The entire loader and stacker attachment is lifted by the lifting mechanism of the tractor or like unit and carried or transported as desired. The bales are placed at the desired delivery point in the actual position in which they are desired to rest and the grapple hooks are disengaged from the bales by introduction of fluid below the piston in cylinder 34 so that the piston rod is projected out from the cylinder. This causes clockwise rotation, when viewed in Figures 1 and 3, of the control shafts 30 and 32 and the arms carried by those shafts. Through the connecting elongated links, shafts 19 and 21 are caused to rotate clockwise and shafts 20 and 22 are caused to rotate counter clockwise, as seen in Figures 1 and 3, to retract the grapple hooks from the bale. When the grapple hooks are completely disengaged from the bales, the frame of the loader device may be lifted from the top surface of the bales and withdrawn.

According to one exemplary form of using the present invention, hay is mowed and windrowed in the usual manner. It is baled in a baler behind which a four-wheeled trailer is pulled. The baler has an extension on the bale chamber which pushes the bales onto the trailer. There one man stacks the bales on the trailer bed and when the trailer is filled, it is unhooked and pulled to the site of the stack. A tractor carrying the stacker attachment of this invention is then positioned at one end of the trailer bed and the frame of the stacker is lowered to lie on top of the top surface of the uppermost layer of bales on the trailer. The piston of the hydraulic motor is then retracted in the manner already described to force the grapple hooks into engagement with the bales comprising the top layer. This layer is then lifted as a unit, carried to the stack and deposited to form one layer of the stack. The same procedure is repeated to build up subsequent layers.

By the use of the stacker attachment of this invention, the bales can be stacked 20 or 25 feet high. The individual bales are placed down in the same relative positions as they had when they were picked up. The stacker and loader attachment can be operated by a single man from the seat of a tractor. It operates without breaking or damaging the bales and without disturbing the position of the bales in the stack. Although the illustrated form of the invention is adapted to handle eight bales, it may obviously be used to move fewer bales and by extending the shafts carrying the hooks, additional hooks can be added and more bales handled. Likewise, the stacker may be made with a single pair of hook-bearing shafts controlled through a single control shaft for lifting and stacking but a single row of bales.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A bale loader and stacker attachment comprising a frame including a transverse horizontal base member and a plurality of horizontal parallel longitudinal members extending therefrom, a pair of parallel horizontal transverse rotatable shafts journaled in bearings carried by said longitudinal frame members, a plurality of grapple hooks supported from said shafts, a secondary frame structure including a pair of parallel horizontal longitudinal members supported above said first named longitudinal members, first and second transverse horizontal control shafts journaled for rotation in bearings supported by said secondary frame, said transverse control shafts being located in said frame remote from said pair of parallel transverse hook-bearing shafts, a hydraulic cylinder pivotally mounted in said frame adjacent to said transverse base member, said hydraulic cylinder having a piston with attached piston rod, a pivotal connection between said piston rod and a control arm secured to said first control shaft, a pair of lever arms secured to and extending radially outwardly from opposite sides of of said first control shaft, a second pair of lever arms each extending radially outwardly from one of said parallel transverse hook-bearing shafts, and elongated link means pivotally connected to said lever arms, one of said links extending between the lever arm of said first control shaft and the lever arm on one of said hook-bearing shafts, the other of said links extending between the lever arm of said first control shaft and the lever arm on the other of said hook-bearing shafts, said grapple hooks being arranged in pairs and the hooks of each pair of hooks being interconnected for simultaneous movement towards or away from each other, whereby when a pair of cooperating hooks are engaged with the top side of a bale of hay and said hooks are actuated, they will penetrate and firmly grasp the bale, whereby the bale may readily be transported from one place to another.

2. A bale loader and stacker attachment according to claim 1 further characterized in that the grapple hooks on said hook-bearing shafts each comprising a rigid arm secured to said shaft and radiating outwardly therefrom and an arcuate tine secured to the outer end of each of said arms, the curvature of said tines being generally that of an arc described by the outer ends of said arms upon rotation about the axes of said hook bearing shafts through about a quarter turn.

3. A bale loader and stacker attachment according to claim 1 further characterized in that first and second pairs of parallel horizontal transverse rotatable hook-bearing shafts are journaled in bearings carried by said longitudinal frame members, said pairs of shafts being spaced apart from one another, and two transverse horizontal control shafts are journaled for rotation in bearings supported by said secondary frame, the control shaft for said first pair of hook-bearing shafts being mounted above and approximately equally spaced from the two shafts of said first pair of hook-bearing shafts, and the control shaft for said second pair of hook-bearing shafts being mounted above and approximately equally spaced from each of the shafts of said second pair of hook-bearing shafts, a control arm secured to each of said control shafts, one of said control arms being pivotally connected to said piston rod, the other of said control arms being pivotally connected to one end of an elongated link the opposite end of which is pivotally connected to said piston rod, a pair of lever arms secured to and extending radially outwardly from the opposite sides of each of said control shafts, a lever arm extending radially outwardly from each of said hook-bearing shafts, elongated link means pivotally connected to the lever arms of said first control shaft and pivotally connected to the respective lever arms of said second pair of hook-bearing shafts, and elongated link means pivotally connected to the lever arms of said second control shaft and pivotally connected to the respective lever arms of said first pair of hook-bearing shafts.

4. A bale loader and stacker attachment according to claim 3 further characterized in that said frame includes an inner pair and an outer pair of horizontal parallel longitudinal members extending from said transverse horizontal base member, and the pair of parallel horizontal longitudinal members comprising said secondary frame structure are spaced above and supported by said inner pair of first named longitudinal members.

5. A bale loader and stacker attachment comprising a frame including a forwardly disposed transverse horizontal base member and a plurality of horizontal parallel longitudinal members extending from said forwardly disposed base member to the rear end of said frame, first and second pairs of parallel horizontal transverse rotatable shafts journaled in bearings carried by said longitudinal frame members, a plurality of pairs of grapple hooks supported from each of said shafts, said pairs of hook-bearing shafts being parallel to one another and spaced apart in said frame, a secondary frame structure including a pair of parallel horizontal longitudinal members supported above said first named longitudinal frame members, first and second transverse horizontal control shafts journaled for rotation in bearings supported by said secondary frame, the first of said control shafts being mounted above and approximately equidistant from each of the shafts of said first pair of hook-bearing shafts and the second of said control shafts being supported above and approximately equidistant from each of the shafts of said second pair of hook-bearing shafts, whereby each of said control shafts is located in said frame above and remote from its respective pair of hook-bearing shafts, a hydraulic cylinder pivotally mounted in said frame adjacent to said transverse base member, said hydraulic cylinder having a piston with attached piston rod, first and second control arms secured to said first and second control shafts, one of said control arms being pivotally connected to said piston rod, an elongated link having one end pivotally connected to said piston rod and said second control arm, a pair of lever arms secured to and extending radially outwardly from opposite sides of each of said control shafts, a lever arm secured to and extending radially outwardly from each of said parallel transverse hook-bearing shafts an elongated link having one end pivotally connected to the lever arm of said first control shaft and having its opposite end pivotally connected to the respective lever arm of said second pair of hook-bearing shafts, and an elongated link pivotally connected to the lever arms of said second control shaft and to the respective lever arm of said first pair of hook-bearing shafts, said grapple hooks being arranged in pairs and the hooks of each pair of hooks being interconnected for simultaneous movement towards or away from each other, whereby when a pair of cooperating hooks are engaged with the top side of a bale of hay and said hooks are actuated, they will penetrate and firmly grasp the bale, whereby the bale may readily be transported from one place to another.

6. A bale loader and stacker attachment according to claim 5 further characterized in that the cooperating grapple hooks of each cooperating pair are aligned longitudinally.

7. A bale loader and stacker attachment according to claim 5 further characterized in that the lever arms on said control shaft are aligned longitudinally with the respective lever arms on said hook-bearing shafts and with the connecting link.

8. A bale loader and stacker attachment according to claim 5 further characterized in that the control arms secured to said control shafts are aligned longitudinally with each other and with the piston rod and link means connecting said piston rod with the more remote of said control arms.

References Cited in the file of this patent

UNITED STATES PATENTS

| | | |
|---|---|---|
| 2,676,837 | Wagner et al. | Apr. 27, 1954 |
| 2,734,646 | Stimpson | Feb. 14, 1956 |